United States Patent [19]

Jordan

[11] 4,016,073
[45] Apr. 5, 1977

[54] PROCESS FOR SLUDGE DISPOSAL AND CIRCULAR LANDFILL SYSTEM

[75] Inventor: Joseph L. Jordan, Lakewood, Colo.

[73] Assignee: Dravo Corporation, Pittsburgh, Pa.

[22] Filed: Apr. 7, 1976

[21] Appl. No.: 674,433

[52] U.S. Cl. .................................. 210/24; 210/68; 210/170; 210/532 S; 61/35

[51] Int. Cl.² .......................................... B01D 15/00

[58] Field of Search ................. 210/10, 170, 532 S, 210/68, 24; 61/35

[56] References Cited

UNITED STATES PATENTS

| | | | |
|---|---|---|---|
| 3,312,070 | 4/1967 | Matsuo et al. | 210/54 R |
| 3,586,624 | 6/1971 | Larson | 61/35 |
| 3,859,799 | 1/1975 | Jaco, Jr. | 61/35 |
| 3,956,119 | 5/1976 | Davidtz | 210/47 |

Primary Examiner—Frank A. Spear, Jr.
Assistant Examiner—E. Rollins Cross
Attorney, Agent, or Firm—Parmelee, Miller, Welsh & Kratz

[57] ABSTRACT

A process for disposal of aqueous sludge material and a circular disposal system for stabilization in a landfill. A circular disposal area with a raised central area and peripheral dike is constructed with pond sectors for the deposition, dewatering, and mixing of sludge with a solid absorbent particulate material. The mixing and compaction of the solids produces a permanent, stable landfill which may be raised and the process cycle repeated. Disposal ponds are located such that dewatering and mixing are accomplished by a cableway which operates radially between the raised central area and any point on the peripheral dike.

7 Claims, 4 Drawing Figures

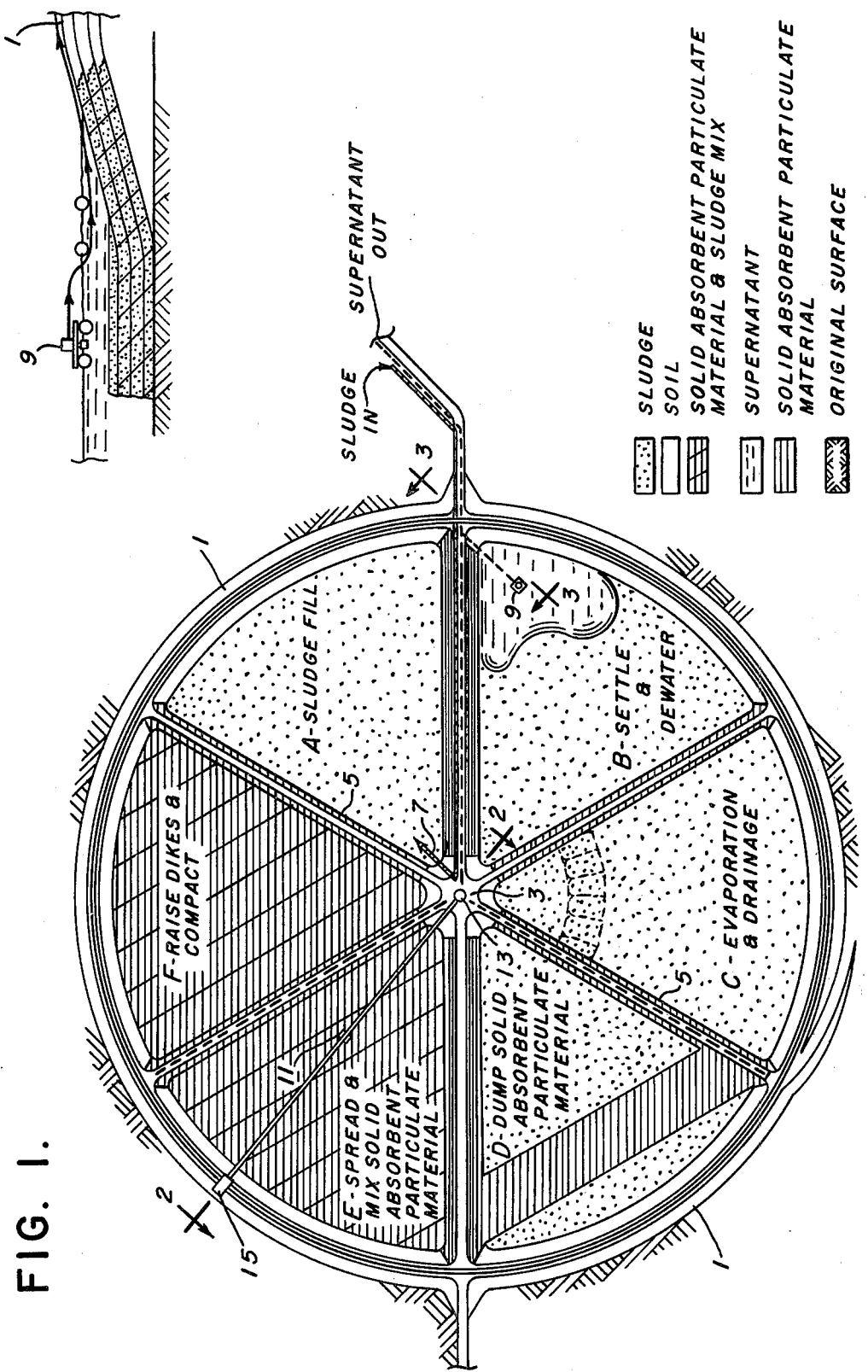

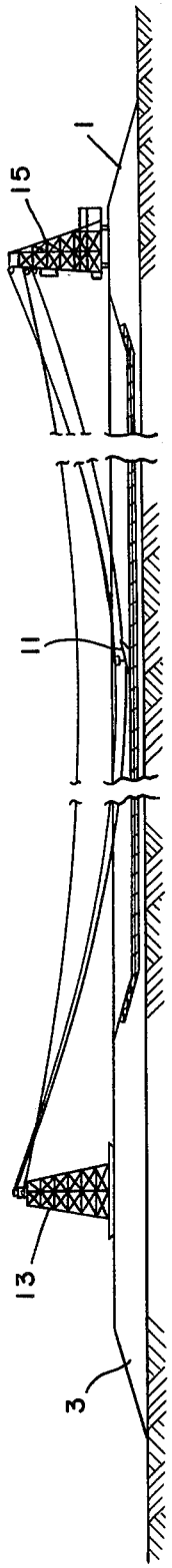

PROCESS FOR SLUDGE DISPOSAL AND CIRCULAR LANDFILL SYSTEM

BACKGROUND OF THE INVENTION

Various systems have been proposed for the deposition and treatment of aqueous sludges containing finely divided solids to form a landfill. With sludges such as those resulting from the desulfurization of combustion gases from coal-burning power plants, which contain suspended solid components, care must be taken to contain and stabilize the sludge solids while preventing erosion, leaching, or other pollution problems.

In coal-burning power plant operations, flue gas desulfurization produces an aqueous sludge containing suspended calcium sulfates and calcium sulfites, which settle very slowly. Other waste materials are usually present including bottom ash, the ash which remains following coal combustion, and fly ash, the finely divided ash carried by the combustion gases.

Systems have been proposed whereby the aqueous sludge is contained, dewatered and combined with a cementitious material so as to form a landfill material. One such proposal is described in U.S. Pat. No. 3,859,799, to Jaco, assigned to the assignee of the present invention. In that patent, there is described a process wherein aqueous sludge solids containing fly ash and calcium components are mixed with a cementitious material and deposited in a holding basin for settling and partial stabilization, with the partially stabilized material then removed and transferred to a second zone for dewatering, and finally again removed, following substantial stabilization, to a stabilized landfill zone, requiring removal and transfer of voluminous amounts of solid material.

The present invention is an improvement over various prior art disposal systems. It provides a unique and efficient circular plan for deposition, dewatering and compacting of sludge solids and, alternatively other waste materials from power plants such as bottom ash and fly ash. Waste materials from other sources may also be treated using the present system.

BRIEF DESCRIPTION OF THE INVENTION

A process for disposing of aqueous sludge material containing suspended solids comprises the formation of a circular disposal area having a raised central area and a peripheral dike. Radial dikes are then constructed to divide the area into sector ponds with a common charging means at the central area and portable supernatant water removal means adjacent the perimeter. Aqueous sludge is charged to a disposal pond and permitted to settle with supernatant liquor collected and removed. Partially dried sludge is subjected to evaporation which is enhanced by mechanical aeration and disturbance of surface crust. A solid absorbent particulate material is deposited on the partially dried sludge solids and mechanically spread and mixed with the sludge so that the mixture can be compacted and the pond finally prepared for re-use by raising the surrounding dikes. The mechanical aeration, disturbing of crust and the spreading and mixing of solid absorbent particulate material with partially dried sludge solids are performed by a drag scraper attached to a cableway which is radially operated between a stationary pivoting tower on the central area and a travelling tower or dragline movable along the perimeter dike.

DESCRIPTION OF THE DRAWINGS

FIG. 1 schematically illustrates a circular disposal area for aqueous sludges and the process of the present invention;

FIG. 2 is a cross-sectional view taken along the line 2—2 of FIG. 1, illustrating the drag scraper system used in the present invention.

FIG. 3 is a cross-sectional view taken along the line 3—3 of FIG. 1, illustrating the perimeter dike and the aqueous supernatant liquor return means; and FIG. 4 is a schedule illustrating the sequential operation of the present process using an approximate six-month cycle.

DETAILED DESCRIPTION

Referring now to FIG. 1, there is schematically illustrated a circular disposal area for use in the present invention for disposal of waste products. Although various aqueous sludges may be treated according to this invention, the following description will relate to waste products from a power plant using a flue gas desulfurization system that produces an aqueous sludge of predominantly calcium sulfate and calcium sulfite components. Additional waste products from such a plant include bottom ash and fly ash.

In the initial construction of the disposal area, a substantially circular perimeter dike 1 is constructed of compacted solids, which perimeter dike is of sufficient height to contain aqueous sludge material and which provides a permanent erosion-resistant outer slope for the landfill. At the center of the circular area, a raised central area 3 is formed. The floor of the area is slightly sloped from the central area 3 to the perimeter 1 so as to encourage collection of supernatant water adjacent the perimeter. The circular disposal area is next subdivided into a plurality of disposal ponds by erecting a plurality of radial dikes 5 which extend from the raised central area 3 to the raised perimeter 1, and, while the number of radial dikes formed may vary, the preferred embodiment, as illustrated, contains six such radial dikes to form six contiguous disposal ponds.

The raised central area, perimeter dike and radial dikes may be formed of natural soil; however, in the handling of waste materials from a power plant, it is advantageous to use compacted bottom ash or fly ash in the formation of these components.

After formation of the circular disposal area with its disposal ponds, the aqueous sludge is treated to form a landfill. As shown in FIG. 1, six disposal ponds A-F are formed with a central feed means 7 adjacent the raised central area 3, that is movable to feed each pond, and a supernatant return means 9 which is movable around the perimeter of the area so as to enable removal of supernatant liquor from each pond.

In FIG. 1, there is illustrated each of the steps for treatment of the sludge, with one of the disposal ponds, A-F, illustrating each of the steps as performed during normal operation. Each step is sequentially used for a particular disposal pond treatment. The aqueous sludge from the flue gas desulfurization process of a power plant is pumped or otherwise transported from the plant and charged to disposal pond A through the central header 7, wherein the aqueous sludge will flow throughout the disposal pond A. When the pond has the requisite amount of aqueous sludge therein, the charging of aqueous sludge to that particular pond is terminated and the aqueous sludge is permitted to settle, as shown in pond B, with solid material settling to the floor of the pond and supernatant aqueous liquor being collected adjacent the perimeter, due to the slope of the pond floor. The collected supernatant aqueous liquor is returned by supernatant return means, such as a pump 9, to the plant for re-use or discharge.

Following the desired settling period, the aqueous sludge solids are subjected to evaporation of water therefrom, with intermittent aeration by turning of material and exposing the material to air and breaking of a crust which forms on the surface of the sludge by a drag scraper 11. The drag scraper 11 is operated between a stationary pivotal tower 13 on the raised central area 3 and a travelling head tower or dragline 15 movable along the perimeter dike 1, the drag scraper being attached to a cableway and operated by known power means (not shown), and moving in a radial direction. This stage of the evaporation is shown at pond C. At pond C there is also illustrated an alternative whereby sludge solids may be scraped into mounds proximate the raised central portion to enhance drainage during times of low evaporative rates.

After the sludge solids have been dragged and subjected to evaporation, a solid absorbent particulate material is deposited on the evaporated sludge solids (pond D), while further evaporative drying may be effected on uncovered sludge solids. The solid absorbent particulate material can comprise natural soil or, when power plant wastes are available, bottom ash or fly ash can be used. The solid absorbent particulate material is deposited, as shown in pond D, at a location where the drag scraper can subsequently be used to spread the same over the surface of the pond. The sludge solids, at this point in time, would probably not be consolidated and dried sufficiently to support a moving vehicle for such spreading.

The solid absorbent material deposited on the evaporated sludge solids should be in an amount which produces a mixture with approximately optimum moisture, as determined by test procedures defined in ASTM 698, when combined with the solids in the sludge deposit. Because of the differing densities, the thickness of the particulate layer when spread would be normally greater than the thickness of the sludge solids layer.

The deposited solid absorbent particulate material is then spread throughout the area of the pond (pond E), using a scraper which spreads and intermixes the solid absorbent particulate material and the sludge solids. The scraper has a blade with teeth to disturb the solids while distributing the solid absorbent particulate material. The scraper is radially reciprocated by the cableway between the standing tower 13 and travelling tower 15 at the perimeter of the disposal area.

Once the solid absorbent particulate material has been spread over the sludge and intermixed therewith to form a landfill material within a particular pond, the layer of mixed materials is compacted, by a conventional earthfill compactor which can reach all corners, and the dikes are then increased in height so as to sequentially re-use a particular pond in the process sequence (pond F). The dike faces are sealed with a layer of mixed materials from the pond prior to refilling with wet sludge.

The formation of a circular disposal area with various disposal pond sectors formed by radial dikes enables an efficient and continuous disposal of aqueous sludges. The disposal area uses a central stationary tower and a travelling tower or dragline around the periphery dike with a single control center such that only one operator is needed for the drag scraper operation and a second operator for any compactor used.

In the operation of a disposal system such as is illustrated in FIG. 1, the sequence is such that one step of the process sequence is occurring at one disposal pond at any particular time. For example, in disposal of waste materials from a coal-burning power plant, where bottom ash and fly ash would be used in formation of the perimeter dike and the radial dikes respectively, and where the aqueous sludge from flue gas desulfurization contains primarily calcium sulfates and calcium sulfites, the operation of the disposal system must be continuous so as to accommodate the disposal of those materials. In FIG. 4, there is illustrated an operation schedule for such a system, with the 25th week of operation corresponding to the illustrated pond designated in FIG. 1. Thus, the sequence of operation can be adjusted with a six pond circular disposal area to accommodate the various time schedules, such as a four-week sludge charging time, a two-week settling time, a six-week evaporation, a four-week dumping of solid absorbent particulate material, a four-week spreading and mixing cycle, and a four-week compacting and dike raising period, with one of each of the six disposal ponds being subjected to a particular process step at a particular time. At other times during the sequence, certain steps may overlap.

What is claimed is:

1. A process of disposing of waste products comprising an aqueous sludge and forming a stable landfill therefrom comprising:
   a. preparing a circular disposal area having a raised central area and a perimeter dike;
   b. subdividing said circular disposal area into a plurality of disposal ponds by erecting radial dikes extending from the raised central area to the perimeter dike;
   c. charging aqueous sludge, from a central charging means into a first of said plurality of disposal ponds, adjacent the raised central area;
   d. permitting the aqueous sludge to settle and form a settled sludge solids while removing supernatant water, formed by settling, from a location proximate the perimeter dike;
   e. partially drying the settled sludge solids by evaporation of further water therefrom while mechanically disturbing any crust formed thereon to expose and aerate additional settled sludge solids;
   f. depositing a quantity of solid absorbent particulate material on the partially dried sludge solids;
   g. spreading the solid absorbent particulate material over the surface of the partially dried sludge solids while mechanically intermixing the two solids to form a landfill material within said disposal pond; and
   h. compacting said landfill material and raising the level of said perimeter dike and radial dikes and repeating the sequence of steps (c)–(h).

2. The process of claim 1 wherein six radial dikes are erected so as to form six contiguous disposal ponds.

3. The process of claim 2 wherein one of each of said disposal ponds is subjected to the steps (c)–(h) at a particular time.

4. The process of claim 1 wherein said waste products also comprise bottom ash and fly ash, in addition to an aqueous sludge from desulfurization of combustion gases of a power plant, and wherein said bottom ash and fly ash are used for construction of the perimeter dike and the radial dikes.

5. The process of claim 1 wherein the solid absorbent material is soil.

6. The process of claim 1 wherein the solid absorbent material is selected from the group consisting of bottom ash and fly ash.

7. The process of claim 1 wherein the disposal pond has a floor which slopes downwardly from the raised central area to the perimeter dike.

* * * * *